United States Patent
Suomela (10) Patent No.: US 6,697,734 B1
(45) Date of Patent: Feb. 24, 2004

(54) SYSTEM AND METHOD FOR DISPLAYING A MAP HAVING TWO SCALES

(75) Inventor: Riku Suomela, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/123,143

(22) Filed: Apr. 17, 2002

(51) Int. Cl.⁷ .......................... G01C 21/00; G08G 1/123
(52) U.S. Cl. ..................... 701/212; 701/211; 340/995.1; 340/995.15
(58) Field of Search .......................... 701/208, 211, 701/212, 213, 214; 345/428, 439, 353, 357; 340/995, 995.1, 995.15

(56) References Cited

U.S. PATENT DOCUMENTS 5,951,622 A * 9/1999 Nomura ....................... 701/212
6,144,920 A * 11/2000 Mikame ....................... 701/212
6,466,862 B1 * 10/2002 DeKock et al. ............. 701/117

OTHER PUBLICATIONS

Bartram et al, "The Continuous Zoom: A Constrained Fisheye Technique for Viewing and Navigating Large Information Spaces", UIST 1995, pp. 207–215.

Furnas et al, "Generalized Fisheye Views", CHI 1986 Proceedings, pp. 16–23, no date.

* cited by examiner

Primary Examiner—Yonel Beaulieu
(74) Attorney, Agent, or Firm—Banner & Witcoff, Ltd.

(57) ABSTRACT

A system and method is provided for displaying a digital map simultaneously having two scales. The digital map includes a detail area having a first scale located in a substantially central portion of the map and an object area having a second scale located in a peripheral portion of the map. Objects are shown in the object area in orientations related to the detail area. The objects represent geographic locations of interest and may also represent landmarks and other prominent features. In one embodiment, the digital map is displayed on a mobile device. The digital map, including either or both areas, may be modified by a user to show different scales. The objects of the map may also be modified. The map may include a location indicator to represent a location of interest, which may be a user's current location.

45 Claims, 6 Drawing Sheets

SYSTEM AND METHOD FOR DISPLAYING A MAP HAVING TWO SCALES

FIELD OF THE INVENTION

This invention relates generally to mobile devices. More particularly, the present invention relates to a system and method for displaying a map having two scales on a such a device.

BACKGROUND OF THE INVENTION

Digital maps are known as navigational aids that are typically interactive. These maps generally permit a user to modify a map display to show a different location or to change the scale of the map. Many of these maps also include a number of objects or symbols, such as common symbols for airports, hospitals, and the like. Many also show a symbol to represent a specific location requested by a user, which may include an endpoint, startpoint, or both for a particular journey requested by the user. Digital maps that provide navigation instructions are also known. These maps typically provide a small-scale map showing a recommended path for a particular journey, as well as optional large-scale turn-by-turn maps showing, in detail, significant steps of the journey.

Navigational digital maps that indicate a user's current location are additionally known. These maps typically take advantage of global positioning system (GPS) technology to show a user's current location on the digital map. These maps are often used as navigation aids, such as for a person driving an automobile, boat, or airplane. They generally include an indicator showing the user's present location and the direction of travel. These maps also typically include common symbols representing the location of airports, hospitals, and the like.

In general, people tend to navigate using maps in two ways. First, many use a map showing detailed surroundings, such as street layouts, street names, buildings, and the like for detailed navigation. Second, many use certain visible or generally well-known landmarks for orientation and navigation, such as bodies of water, mountains, famous buildings, or other landmarks. These methods are not exclusive and most people use both methods for navigation. For example, in the case of a digital map providing directions from a startpoint to an endpoint, users tend to refer to a large-scale map showing the entire path with larger landmarks to generally orient themselves. Users then tend to refer to turn-by-turn detailed scale maps to view details such as street names for detailed navigation.

Each of these conventional maps typically shows only one scale at a time and is thus limited to providing either detailed large scale views with few, if any, landmarks included therein, or small scale views. For example, the turn-by-turn maps of the previous example typically do not include landmarks and other prominent features outside of the detailed view. As such, the user can easily become disoriented, and must zoom in and out to re-orient himself or herself using landmarks or other known features. On the other hand, the smaller scale views, which may include many landmarks for orienting the user, are generally not detailed enough for detailed navigation purposes.

SUMMARY OF THE INVENTION

The present invention provides a system and method for displaying a map having two simultaneously displayed scales. The map generally includes a detail area located in a substantially central portion of the map, which preferably includes a local or detailed scale, and an object area located in a peripheral portion of the map, which preferably includes a smaller scale. Objects are shown in the object area in orientations related to the detail area. Accordingly, a user may generally navigate using landmarks and other known objects in the object area for orientation, as well as street names, buildings, and other details shown in the local scale for detailed navigation. Thus, when focusing on local scale details, such as when following the steps of a route, a user can remain properly oriented through objects shown in the object area.

According to one embodiment of the invention, the map is a digital map displayed on a mobile computing device. As such, the map is generally interactive and modifiable. A user can, therefore, modify the detail area, the object area, or both. For example, the user can change the scale or location shown in the detail area. Further, the user could change or modify some or all of the objects shown in the object area. For example, the user may want to see all of the tall buildings in his general location as objects for use in navigation. In another example, the user may want to know where his home is at all times. Accordingly, he could add his home as a permanent object that would always be visible in the object area. If his home is a great distance away such that it is not within the current map view and scales, a permanent object representing his home may be continuously shown in its proper orientation or alignment with the center of the map, but not necessarily its proper location. In a further example, the user may be a tourist who wants to know where his hotel, the airport, and famous landmarks are as a way to better understand his new environment.

In other embodiments of the invention, computer-executable instructions for implementing the disclosed methods are stored on computer-readable media. Other features and advantages of the invention will become apparent with reference to the following detailed description and figures, where like numbers refer to like features.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
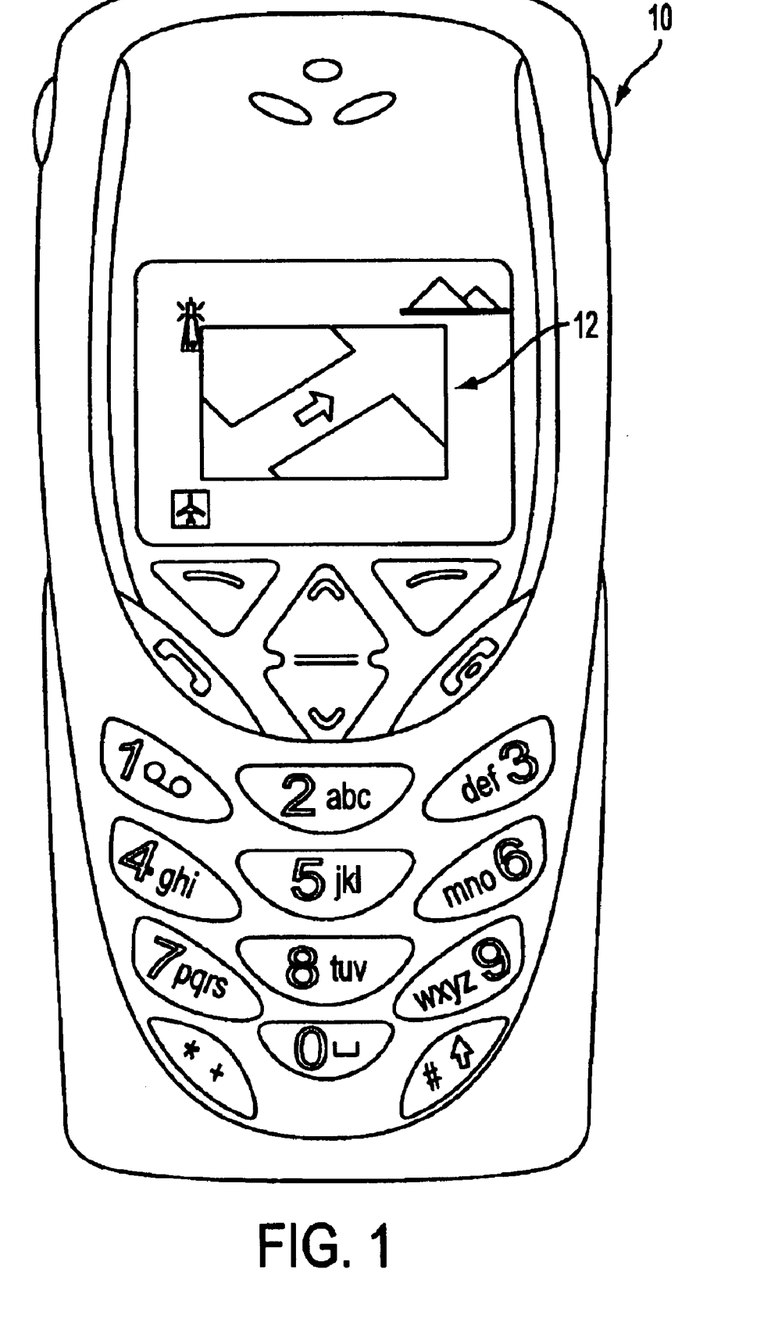
FIG. 1 shows a layout of a system for using the present invention that includes a map according to the present invention displayed on a mobile device.
Figure 2:
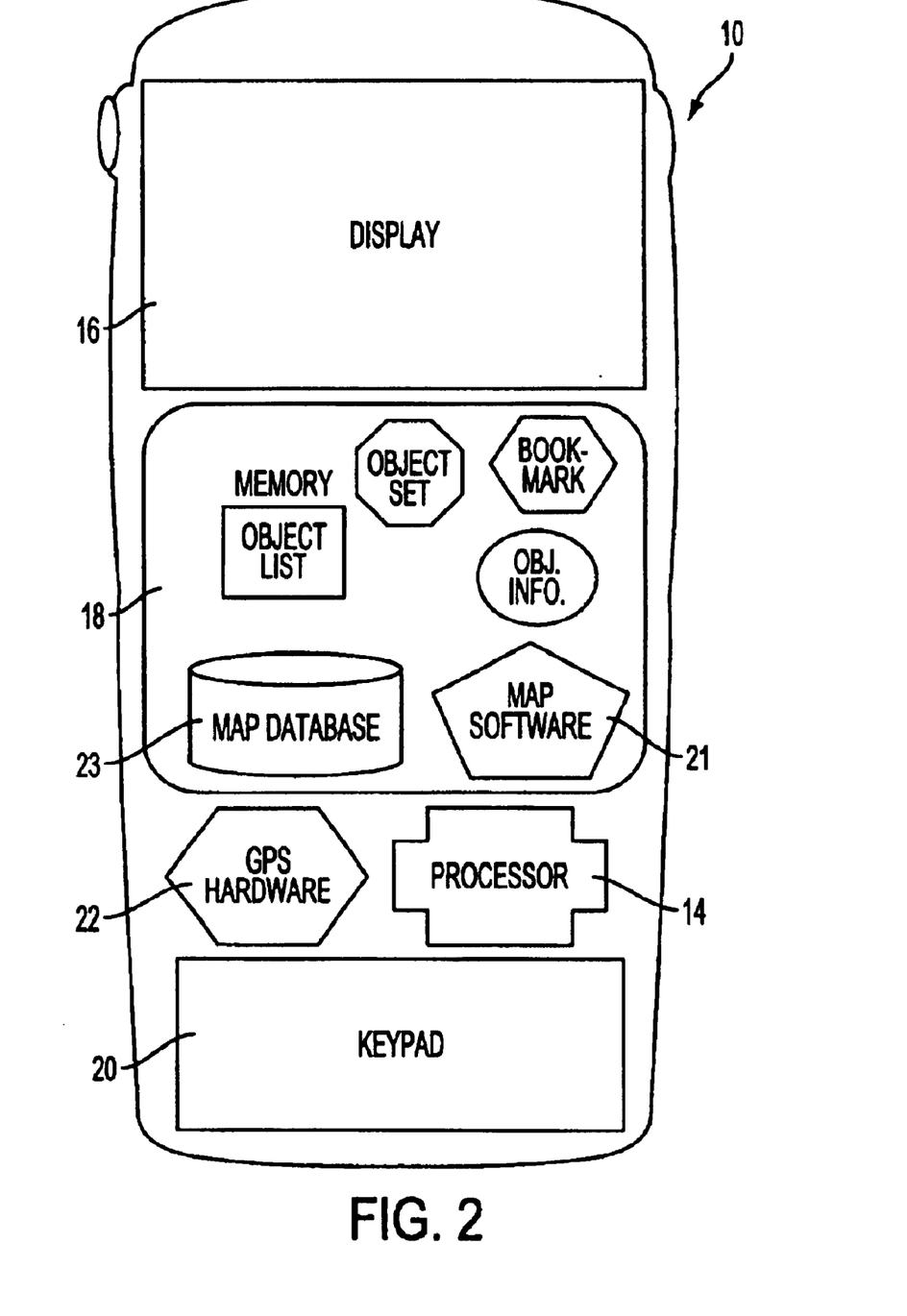
FIG. 2 shows a functional block diagram of the mobile device of FIG. 1.

The invention may be embodied in various forms. As shown in FIGS. 1 and 2, one embodiment according to the present invention includes a mobile device 10 displaying a digital map 12. The mobile device 10 generally includes a processor 14, display 16, memory 18 and keypad 20. In another embodiment according to the invention, the mobile device 10 additional includes global positioning system (GPS) hardware 22. The processor 14 is in communication with the memory 18 and performs instructions stored therein. The processor 14 is connected to the display 16 and generates a display of a map 12 thereon. The keypad 20 is also in communication with the processor 14 for providing inputs to the processor. In combination, the keypad 20, display 16 and processor 14 generally form a graphical user interface (GUI), which allows a user to interact with the device and modify displays shown on display 16. The GPS hardware 22 receives GPS transmissions (not shown) and communicates with processor 14 to enable the processor to determine current location information for mobile device 10. Thus, mobile device 10 is generally a mobile computing device, such as a handheld personal computer, mobile communication device, mobile terminal, or the like.

In accordance with instructions in the memory 18, the processor performs steps for displaying a digital map 12 on the display. The instructions may be in the form of map software 21 stored in memory 18. The map software 21 according to one embodiment refers to data stored in map database 23, which is also stored in memory 18, in order to generate digital map 12. In another embodiment, map software 21 may receive data via a communications network (not shown) to use in generating map 12.

Figure 3:
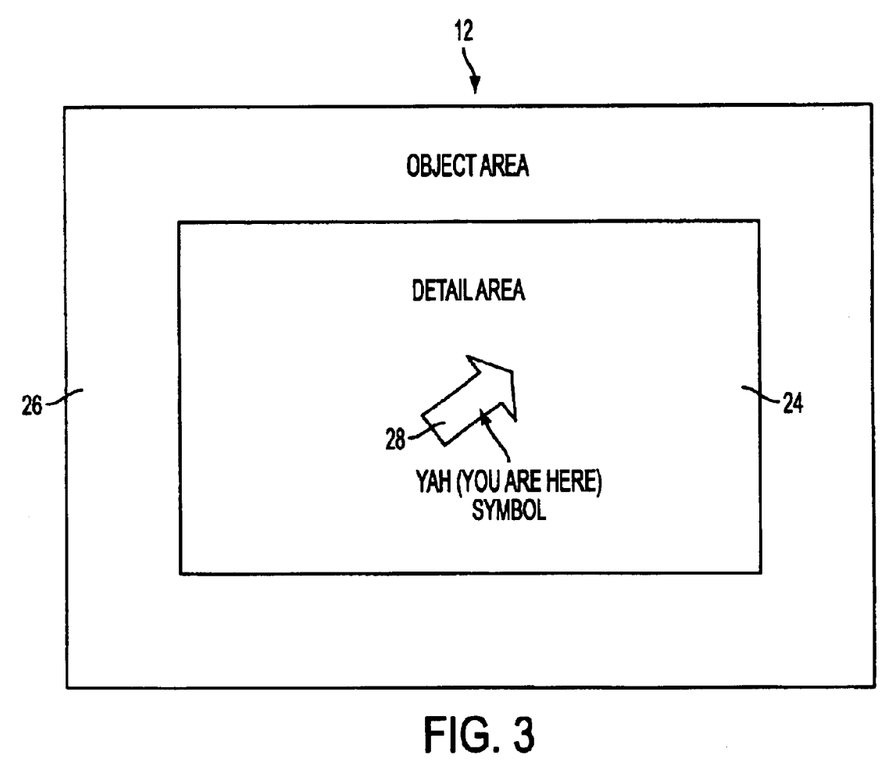
FIG. 3 shows an embodiment of a map according to the present invention including a location indicator in the detail area of the map.

Referring to FIG. 3, the digital map 12 generally includes a detail area 24 located substantially in a central portion of the digital map 12, and an object area 26 located in a peripheral area of the digital map 12. In a preferred embodiment, the object area 26 generally surrounds the detail area 24. The detail area 24 may include a location indicator 28, which shows a location of interest around which the digital map is generally centered. The location indicator 28 may include a You Are Here (YAH) indicator or symbol as is common on many maps, which shows the current location of mobile device 10. In one embodiment, the YAH symbol 28 indicates the direction of travel and current location of the mobile device as determined using GPS hardware 22. In another embodiment, location indicator symbol 28 indicates a location of interest, such as a location entered by a user and may be represented, for example, by a star (not shown), a cross (not shown), or other such symbol.

Figure 4:
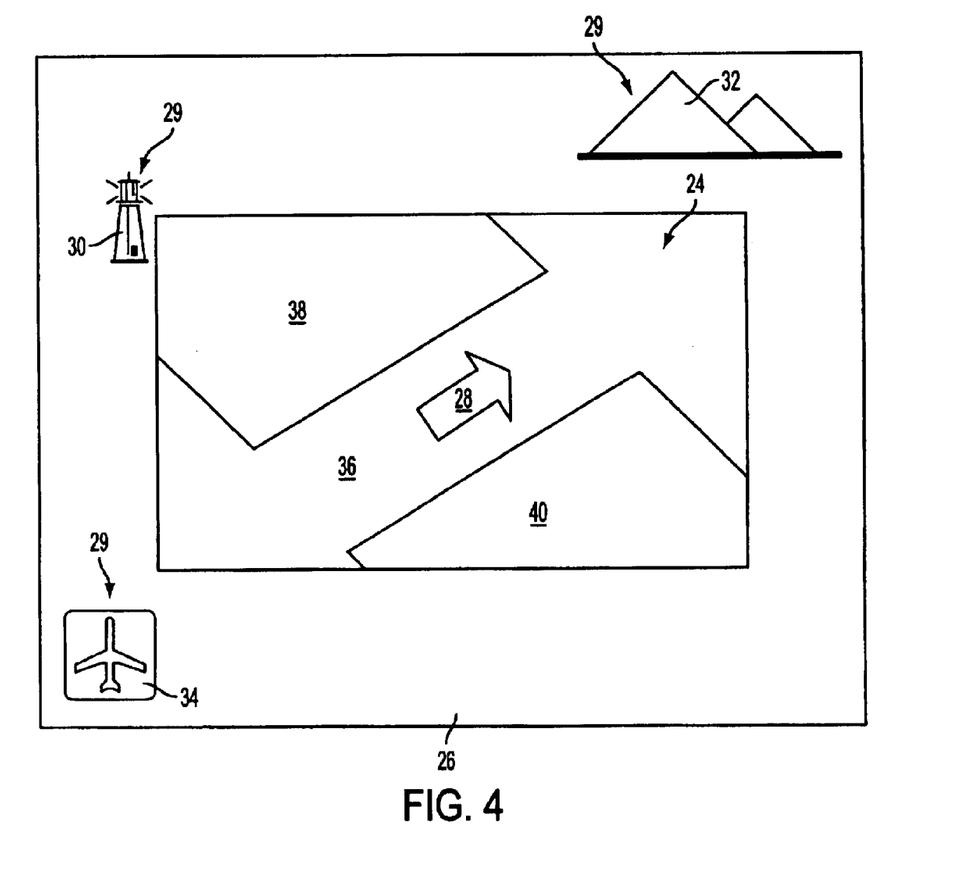
FIG. 4 shows another embodiment of a map according to the present invention including landmark objects in the object area of the map.

Referring now to FIG. 4, a digital map 12 according to another embodiment of the present invention is shown, which has several objects 29 located in object area 26, and in which map details are shown in detail area 24. The detail area 24 shows details for a geographic area of interest. For example, the detail area 24 may show a street 36 and portions of city blocks 38, 40 adjacent to street 36. The level of detail may vary according to the geographical area represented, the scale of the detail area, options and settings for displaying the digital map 12, and other factors.

The objects 29 generally include icons that each represent a geographical location, and which may also represent a landmark located at the respective location. For example, one object includes a lighthouse icon 30 representing the geographical location where an actual lighthouse (not shown) is located. Also, another object includes a mountain icon 32 representing the geographical location where mountains are located, and a further object includes an airport icon 34 representing the geographical location of an airport. Landmarks represented by objects 29 may include prominent landscape characteristics, structures, or other prominent features. Objects, however, are not limited to landmarks and may include any geographical location. For example, an object may represent the location where an event occurred as entered by a user, such as a spot in a forest where the user observed a deer. Accordingly, a user may create his own object to represent a location of interest.

The areas 24, 26 of digital map 12 are generally oriented as a cohesive unit, such that object area 26 and detail area 28 maintain an alignment with each other. Each of portions 26, 28, however, may not have the same scale. For example, detail area 24 may have a large scale, such as 1:5,000, where 1 meter represents 5,000 meters (e.g. a 4 cm wide detail area may represent 200 meters or ⅛ mile), and the object area 26 may have a smaller scale, such as 1:500,000. The terms "large scale" and "small scale" generally refer to the magnitude of the representative fraction; thus, ⅕,₀₀₀ is a larger fraction than ⅕₀₀,₀₀₀.

According to one embodiment, processor 14 generates appropriate displays according to instructions contained in map software 21 and data contained in map database 23 for map features within detail area 24 according to the scale of detail area 24. If, for example, detail area had a display size of 4 cm by 3 cm and the scale of detail area were 1:5,000, processor 14 would generate a map display of a geographical area 200 meters by 150 meters centered about the location represented by location indicator 28. Further, suppose object area 26 had a display size of 6 cm by 5 cm centered around display area 24; thus, having an effective object area 26 that is 2 cm wide around display area 24. For a 1:500,000 scale, processor 14 would generate a map display of a geographical area in a band about 10 kilometers around the geographical area represented in detail area 24.

Figure 5:
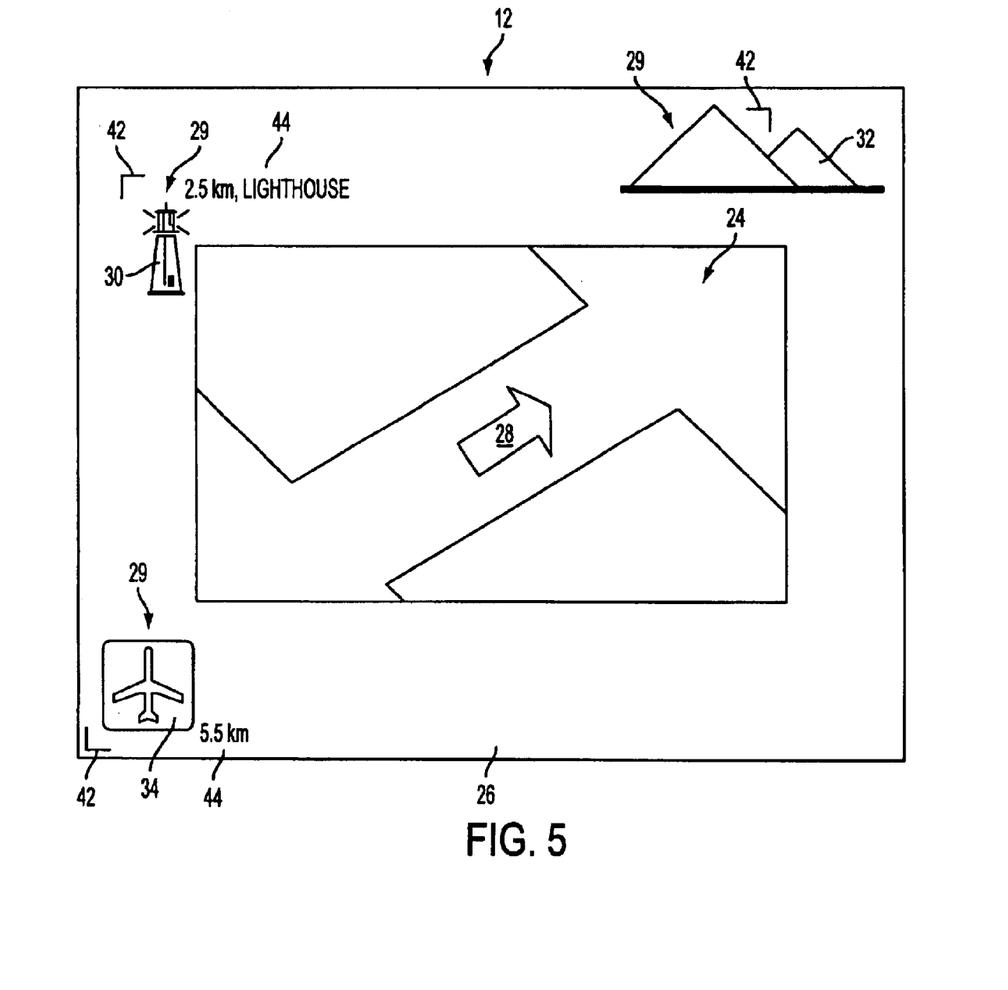
FIG. 5 shows a further embodiment of a map according to the present invention including direction and distance indications to objects in the object area of the map from a location indicated in the detail area of the map.

Referring now to FIG. 5, a further embodiment of a digital map according to the present invention is shown, which includes direction indicators 42 and distance indicators 44 for each of the objects 29. The direction indicators 42 show the direction from the center of the map, which is represented by location indicator 28, to each of objects 29. The distance indicators 44 show the distance from the center of the map or location indicator 28 to each of objects 29. As the locations represented by location indicator 28 and objects 29 are known, the processor 14 is able to determine both distance and direction between these locations, using, for example, algorithms contained in map software 21. Both direction indicators 42 and distance indicators 44 may be selectively shown for each of objects 29. For example, object 32 does not include a distance indicator, whereas objects 30 and 34 do include distance indicators. This may be according to a user preference for showing the distance to the lighthouse and the airport. In accordance with the scale of object area 24 and the actual locations of the lighthouse and airport represented by objects 30 and 34, the lighthouse object 30 is shown as being closer to the location of interest represented by location indicator 28 than the airport object 30.

In operation, mobile device 10 displaying digital map 12 is a very useful tool for navigation. The combination of detail area 24 and object area 26 allows a user to navigate using landmarks represented in the object area 26 for orientation, as well as street names, buildings, and other details shown in detail area 24 for detailed navigation. Thus, when focusing on local scale details, such as when following the steps of a route, a user can remain properly oriented by referring to objects 29 shown in object area 26. To illustrate, suppose for example that a user has flown to a new city that is unfamiliar to him. Suppose also that mobile device 10 includes detailed map information stored in map database 23 for the new city, and that the map information includes a standard set of objects 29 for the new city, which are also stored in map database 23. Suppose further that the digital map shown in FIG. 5 represents a portion of the new city including the standard set of objects 29, which are shown as lighthouse 30, mountains 32, and airport 34. Additionally, suppose that mobile device 10 is able to continually update and monitor its location via GPS hardware 22.

As shown in FIG. 5, the user is able to navigate through streets of the new city by referring to mobile device 10. Suppose further that the user has recently arrived into the new city and is currently traveling via taxicab from the airport on street 36. By referring to mobile device 10, the user is able to track his route in detail area 24 while maintaining his orientation with known objects in object area 26. Objects, such as airport object 34 representing the airport he arrived at, mountain object 32 that represent mountains he can see in the distance, and lighthouse object 30 representing a famous lighthouse that he saw while landing at the airport, may assist him in learning the layout of the new city. Location indicator 28 shows the user's current location and direction of travel.

Figure 6:
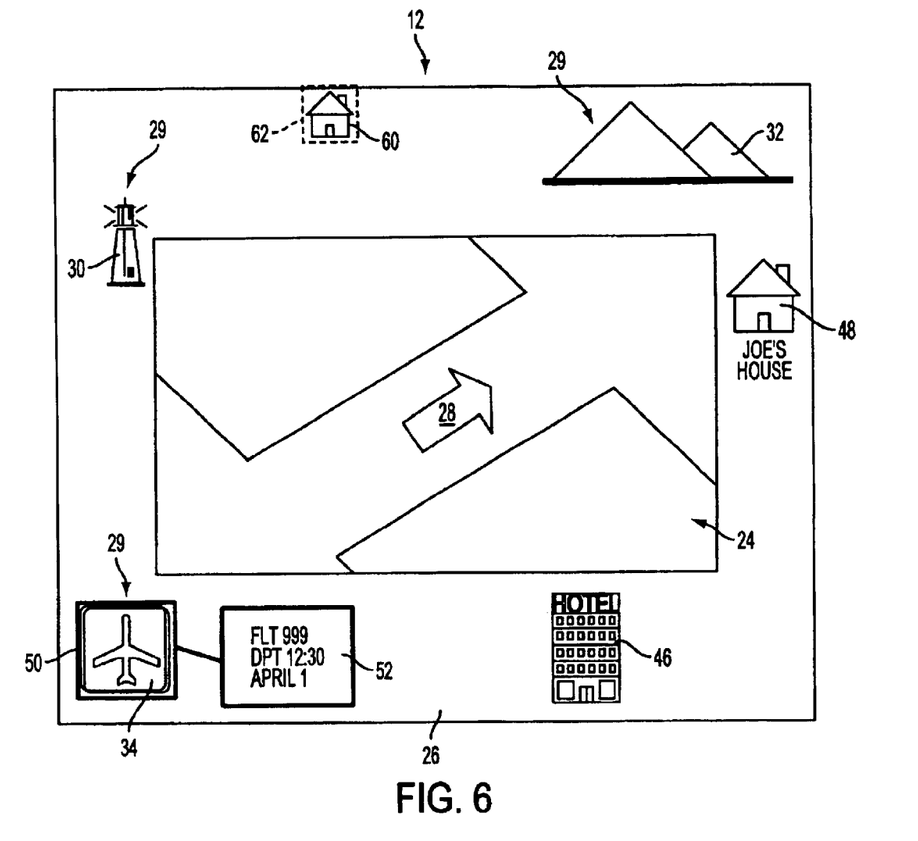
FIG. 6 shows a further embodiment of a map according to the present invention including landmark and customized objects shown in the object area of the map.

Suppose that as the user is spending time in the new city he would like to add objects to object area 26 that are of interest to him. For example, he may want to add his hotel to the map and the location of a friend's home. As shown in FIG. 6, the user is able to customize the digital map 12 to include objects representing the location of these structures. The user may customize digital map 12, for example, by interacting with mobile device 10 via keypad 20. To do so, he may need to enter location information, such as address information or longitude and latitude information. Alternatively, he may simply select an option for adding a current location as an object while he is at his hotel or his friend's home (e.g. Joe's house). In this case, map software 21 may be programmed to automatically enter the location information obtained using GPS hardware 22 in response to an entry from the user via keypad 20. Accordingly, hotel object 46 and Joe's house object 48 would be added to object area 26.

According to one aspect of the invention, objects 29 may be modified to include additional information. For example, the user visiting a new city may desire the airport object 34 to include information about his departure flight. Accordingly, the user may enter this information into mobile device 10 using, for example, keypad 20. This information could be stored in memory 18 and displayed when the associated icon is selected. As shown in FIG. 6, if the user selects airport object 34, for example by moving cursor 50 over airport object 34, then the processor would generate the additional information 52 on display 16.

According to other aspects of the invention, digital map 12 may modified by the user in a number of different ways. The modifications may be made via a direct interface with mobile device 10, such as through keypad 20 or other input devices; through interfaces with other computing devices, such as a universal serial bus (USB) connection with another computer; through interaction with a communication network, such as a wireless network; or other such interfaces. In one aspect of the invention, either or both detail area 24 and object area 26 may be modified. For example, the user may modify the scale of detail area 24 as he zooms in and out, thereby viewing more or less area in detail. In another example, object area 26 may be modified to also have a larger or smaller scale.

In further examples, objects 29 may be modified by customizing them according to user preferences. For instance, a user may download a set of objects pertaining to a certain location. Accordingly, the user may browse a website (not shown) that includes such objects and then select objects of interest for a certain location to be downloaded. In another instance, the user may bookmark certain objects 29 of interest. As such, the user may enter an option to bookmark, for example, airport object 34. If the user has removed airport object 34 from object area 26 previously, such as by using keypad 20, but now wishes to know where the associated airport is located in relation to the location being viewed in detail area 24, the user may select the airport object bookmark (not shown). Accordingly, the airport object 34 will be added to object area 26. In a further example, a user may desire to name an object to assist him in remembering what the object represents. Accordingly, the user may interact with mobile device 10 to add a name to a particular object, which could be additional information viewed when the object is selected, or could be listed along with the object icon. As an example, FIG. 6 shows object 48 with the label of "Joe's House" as named by the user.

Further examples of customizing the objects 29 in object area 26 may include downloading a particular object of interest from, for example, a website (not shown), or deleting an object that is no longer of interest. Additional examples include creating a list of objects, such as a list of bookmarked objects or a list of bookmarks for a particular category, such as objects for the city of Chicago. Accordingly, the user may refer to the list of objects for Chicago and then select an object of interest to view the location associated with that object. As such, the object may be viewed in detail area 24 along with adjacent details for that location.

In another example, a user may create a set of objects. Accordingly, the user adds a number of objects to a set. To illustrate, suppose the user creates a set known as "hotels I like." He may then add objects for hotels that he likes to the set. If he wishes to view all hotels that he likes, he may simply select the set. The map 12 would then display, for example, all of the hotel objects in the set on object area 26 and show his current location or another area of interest in detail area 24. Such modifications may be stored in memory 18 as shown in FIG. 2. For example, a list of objects 54, a set of objects 56, or a bookmark 58 may be stored in memory 18.

According to a further aspect of the invention, regardless of the scale or areas 24, 26, certain objects may always be represented on the map. These "permanent objects" may be objects that are designated as such. As such, if the location represented by a permanent object is within the current viewing area of either area 24, 26, it will be shown in its accurate representative location on map 12. If, however, the location represented by a permanent object is not represented by the current view of map 12, its alignment may be accurate in comparison to the location represented by location indicator 28, but not its distance. For instance, suppose a user's home is located 1000 kilometers away from the location represented in detail area 24 and object area 26. As shown in FIG. 6, if the user designated a home object 60 as a permanent object, it would still be represented in object area 26. However, the location of home object 60 would not be accurate according to the scale and geographical area represented in object area 26. The alignment of home object 60 would be accurate in relation to the location represented by location indicator 28. To accomplish this, processor 14 could simply calculate the location and direction of home object 60. If home object 60 were designated as a permanent object according to options in map software 21, the processor could place home object 60 at an outer edge of object area 26 in a proper direction from location indicator 28. Home object 60 could be designated as located not to scale, for example by a dashed line 62 around home object 60, when the location it represents is not actually represented on the current display.

While the present invention has been described in connection with the illustrated embodiments, it will appreciated and understood that modifications may be made without departing from the true spirit and scope of the invention. In particular, the invention applies to any computing device adapted to display a digital map. Further, digital map 12, including either or both areas 24, 26 may be modified in numerous ways and according to user preferences.

I claim:

1. An apparatus for displaying a cohesive map having areas of different scales, the apparatus comprising:
   a display device; and
   a processor coupled to the display device that performs steps comprising:
   (a) displaying on the display device the cohesive map, the cohesive map comprising:
      a detail area located in a substantially central portion of the map and having a first scale; and
      an object area separate from the detail area and displayed substantially simultaneously with the detail area, the object area located in a peripheral portion of the map and having a second scale, the object area showing objects oriented in relation to the detail area; and
   (b) modifying one of the detail area and the object area of the map.

2. An apparatus for displaying a map having areas of different scales, the apparatus comprising:
   a display; and
   a processor coupled to the display that performs steps comprising:
   (a) displaying on the display the map comprising:
      a detail area located in a substantially central portion of the map and having a first scale; and
      an object area located in a peripheral portion of the map and having a second scale, the object area showing objects oriented in relation to the detail area; and
   (b) modifying one of the detail area and the object area of the map:
      wherein the object area substantially surrounds the detail area.

3. The apparatus of claim 1, wherein the first scale is larger than the second scale and shows greater detail.

4. The apparatus of claim 1, wherein the objects comprise icons that each represent a geographical location.

5. The apparatus of claim 4, wherein the each one of the icons further represents a landmark located at the respective geographic location.

6. The apparatus of claim 1, wherein step (b) comprises the step of changing one of the first and second scales.

7. The apparatus of claim 1, wherein step (b) comprises the step of customizing the objects shown in the object area.

8. The apparatus of claim 7, wherein the step of customizing the objects shown in the object area comprises downloading at least one object.

9. The apparatus of claim 7, wherein the step of customizing the objects shown in the object area comprises bookmarking at least one object.

10. The apparatus of claim 7, wherein the step of customizing the objects shown in the object area comprises creating an object.

11. The apparatus of claim 7, wherein the step of customizing the objects shown in the object area comprises adding an object to a location on the map.

12. The apparatus of claim 7, wherein the step of customizing the objects shown in the object area comprises naming at least one object.

13. The apparatus of claim 7, wherein the step of customizing the objects shown in the object area comprises deleting an object.

14. The apparatus of claim 7, wherein the step of customizing the objects shown in the object area comprises creating a list of objects of interest.

15. The apparatus of claim 7, wherein the step of customizing the objects shown in the object area comprises creating a set of objects.

16. The apparatus of claim 7, wherein the step of customizing the objects shown in the object area comprises designating one of the objects as a permanent object, wherein the permanent object is always shown on the map.

17. The apparatus of claim 7, wherein the step of customizing the objects shown in the object area comprises adding information to an object.

18. The apparatus of claim 17, wherein the processor performs the further step of displaying the added information in response to selection of the object.

19. The apparatus of claim 1, wherein each object represents a location having known coordinates.

20. The apparatus of claim 1, wherein the processor performs the further step of displaying a location indicator in the detail area of the map.

21. The apparatus of claim 20, wherein the location indicator represents a user location.

22. The apparatus of claim 21, wherein the processor performs the further step of determining the user location.

23. The apparatus of claim 20, wherein the location indicator shows a direction.

24. The apparatus of claim 20, wherein the processor performs the further step of displaying a distance from the location indicator to at least one of the objects.

25. The apparatus of claim 20, wherein the processor performs the further step of displaying a direction from the location indicator to at least one of the objects.

26. The apparatus of claim 1, wherein the apparatus comprises a portable device.

27. A method for presenting navigation information using a digital map, the method comprising the steps of:
   (a) displaying the digital map comprising:
      a detail area located in a substantially central portion of the digital map and having a first scale; and
      an object area located in a peripheral portion of the digital map and having a second scale, the object area being displayed substantially simultaneously with the detail area, the object area showing objects oriented in relation to the detail area; and
   (b) modifying one of the detail area and the object area of the digital map.

28. The method of claim 27, wherein step (b) comprises the step of changing one of the first and second scales.

29. A method for presenting navigation information using a digital map, the method comprising the steps of:
   (a) displaying the digital map comprising:
      a detail area located in a substantially central portion of the digital map and having a first scale; and
      an object area located in a peripheral portion of the digital map and having a second scale, the object area showing objects oriented in relation to the detail area; and (b) modifying one of the detail area and the object area of the digital map;
wherein step (b) comprises the step of customizing the objects shown in the object area.

30. The method of claim 29, wherein the step of customizing the objects shown in the object area is selected from the group consisting of bookmarking at least one object, creating an object, adding an object to a location on the map, naming at least one object, deleting an object, creating a list of objects, creating a set of objects, downloading at least one object, designating one of the objects as a permanent object, and adding information to an object.

31. The method of claim 27, comprising the further step of displaying a location indicator in the detail area of the digital map.

32. The method of claim 31, wherein the location indicator represents a user location.

33. The method of claim 32, further comprising the step of determining the user location.

34. The method of claim 31, wherein the method further comprises the step of displaying a distance from the location indicator to at least one of the objects.

35. The method of claim 31, wherein the method further comprises the step of displaying a direction from the location indicator to at least one of the objects.

36. A computer-readable medium containing computer-readable instructions for performing the steps comprising:
   (a) displaying a digital map comprising:
      a detail area located in a substantially central portion of the digital map having a first scale; and
      an object area located in a peripheral portion of the digital map having a second scale, the object area showing objects oriented in relation to the detail area, the object area being displayed substantially simultaneously with the detail area; and
   (b) modifying one of the detail area and the object area of the digital map.

37. The computer-readable medium of claim 36, wherein step (b) comprises the step of changing one of the first and second scales.

38. A computer-readable medium containing computer-readable instructions for performing the steps comprising:
   (a) displaying a digital map comprising:
      a detail area located in a substantially central portion of the digital map having a first scale; and
      an object area located in a peripheral portion of the digital map having a second scale, the object area showing objects oriented in relation to the detail area; and
   (b) modifying one of the detail area and the object area of the digital map;
wherein step (b) comprises the step of customizing the objects shown in the object area.

39. The computer-readable medium of claim 38, wherein the step of customizing the objects shown in the object area is selected from the group consisting of bookmarking at least one object, creating an object, adding an object to a location on the map, naming at least one object, deleting an object, creating a list of objects, creating a set of objects, downloading at least one object, designating one of the objects as a permanent object, and adding information to an object.

40. The computer-readable medium of claim 36, further comprising computer-readable instructions for performing the step of displaying a location indicator in the detail area of the map.

41. The computer-readable medium of claim 40, wherein the location indicator represents a user location.

42. The computer-readable medium of claim 41, further comprising computer-readable instructions for performing the step of determining the user location.

43. The computer-readable medium of claim 40, further comprising computer-readable instructions for performing the step of displaying a distance from the location indicator to at least one of the objects.

44. The computer-readable medium of claim 40, further comprising computer-readable instructions for performing the step of displaying a direction from the location indicator to at least one of the objects.

45. A portable device for displaying a digital map having areas of different scales, the apparatus comprising:
   an input device;
   a display screen showing the digital map comprising:
      a detail area located in a substantially central portion of the digital map, the detail area having first scale; and
      an object area located in a peripheral portion of the digital map having a second scale smaller than the first scale, the object area showing objects oriented in relation to the detail area, the object area being displayed substantially simultaneously with the detail area;
   location detection hardware; and
   a processor coupled to the display screen, the input device, and the location detection hardware that performs steps comprising:
      (a) determining a current location for the mobile device based on information received from the location detection hardware;
      (b) displaying the digital map on the display screen and showing substantially simultaneously both the detail area and the object area in an orientation related to the current location; and
      (b) modifying one of the detail area and the object area of the digital map in response to receiving an input from the input device.

* * * * *